(No Model.)

E. B. LA FOLLETTE.
BOOT CRIMPER.

No. 357,836. Patented Feb. 15, 1887.

WITNESSES:
Fred G. Dieterich
John C. Kenon

INVENTOR:
E. B. La Follette
BY Munn & Co
ATTORNEYS.

UNITED STATES PATENT OFFICE.

ELERY BELL LA FOLLETTE, OF FLEMINGTON, WEST VIRGINIA.

BOOT-CRIMPER.

SPECIFICATION forming part of Letters Patent No. 357,836, dated February 15, 1887.

Application filed October 9, 1886. Serial No. 215,802. (No model.)

*To all whom it may concern:*

Be it known that I, ELERY BELL LA FOLLETTE, of Flemington, in the county of Taylor and State of West Virginia, have invented a new and useful Improvement in Boot-Crimpers, of which the following is a specification.

My invention consists in an improved boot-crimper or crimping-clamp, which will be hereinafter fully described and claimed.

Figure 1:
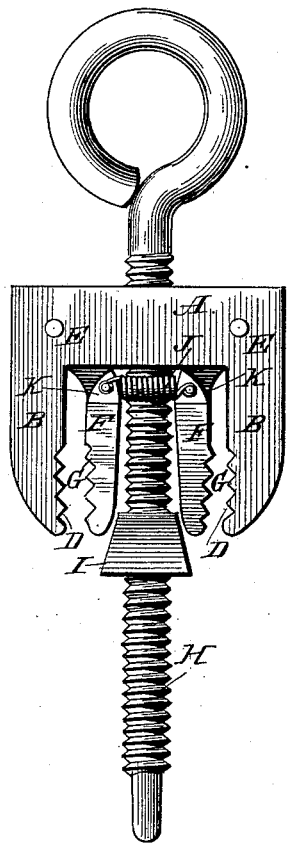
Figure 2:
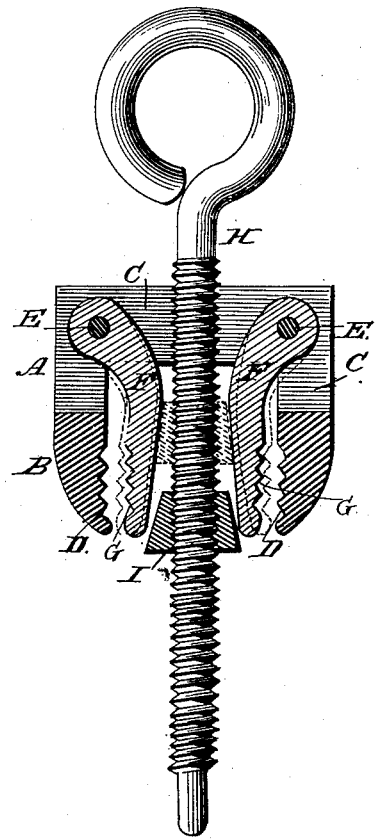
Figure 3:
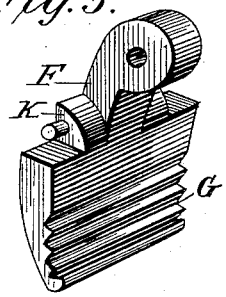

Referring to the accompanying drawings, Figure 1 is a side view. Fig. 2 is a central vertical section, and Fig. 3 is a detail view of one of the inner jaws.

The same letters of reference indicate corresponding parts in all the figures.

Referring to the several parts by letter, A represents the yoke-shaped body portion of the clamp, which is a solid piece of cast-iron, the parallel sides or jaws B of which form the stationary outside primary jaws. The top of the main part A of the clamp has a longitudinal slot, C, formed in it, as shown, and the inner faces of the primary jaws B are formed with the transverse corrugations D, while in the slot C are pivoted or hinged, on the transverse pivot-bolts E, the upper reduced ends of the movable inner jaws, F, the operative faces of which are formed with the transverse corrugations G, and as the outside and inside jaws are stationary in a vertical plane with reference to each other—that is, as neither pair of jaws has any independent vertical movement apart from the other jaws—the teeth of the inner jaws will always meet and fit within the corresponding corrugations of the outer jaws, and thus always hold the leather tightly and securely without the possibility of slipping. The corners or edges of the lower ends of both the outer and inner jaws are rounded, as shown.

H indicates the operating or crimping screw, which is preferably formed of a wrought-iron rod having its upper end bent to form a ring, and having a screw-thread cut on it extending from within one-half inch of its ringed end to within one half inch of its lower plain reduced end. This screw slides freely through the slot C, as there are no threads cut at the point where it passes through the slot, and extends between the inner jaws, and on its lower portion fits the wedge-shaped clamping-block I, having the usual central threaded aperture, through which the screw works.

The upper parts of the hinged inside jaws, above the point to which the clamping-block can rise, are connected by the spring J, which serves to draw the said jaws against the clamping-block.

The upper reduced ends of the pivoted inside jaws have the upper auxiliary jaws, K, formed on them, which bear against the slotted top piece of the outside jaws when the inside jaws are drawn open by the spring J, and thus prevent the inside jaws from rubbing against or coming in contact with the threads of the screw, being placed at such points as to stop the jaws at such points as to just let the screw pass between them without touching.

In operation the boot-upper is placed about the ordinary forming-block, and the reduced plain lower end of the screw having been placed in the aperture in the back or point of the heel of the form, the corners of the leather are inserted between the open jaws of the clamp. The jaws being separated or opened by the tension of the spring J, which facilitates the entrance of the leather between the jaws, and the plain inner sides of the inner jaws having their upper portions made straight, while their main lower portions are beveled to fit the beveled sides of the clamping nut or block, enables the jaws to open wider than they otherwise could, and admits the easy entrance of any thickness of leather. The screw is then rotated and works the beveled block up between the inner jaws, thus clamping the leather firmly between the corrugated or grooved jaws and working the clamp upon the screw, so as to strain the upper about its forming-block. Owing to the peculiar shape of the inner sides of the inside jaws, and the fact that they cannot slip vertically independently of the outer jaws, the clamping-nut cannot pull up so far as to let the leather loose. The spring serves to draw the inner jaws against the clamping-block, to facilitate the entrance of the leather between the jaws, and to automatically open the jaws to release the leather when the operation is completed.

Having thus described my invention, what I claim, and desire to secure by Letters Patent, is—

1. The combination, with the main piece A, having the longitudinal slot C and the rigid depending jaws B B, of the movable jaws F F, reduced at their upper ends and pivoted by pivots E within the slot C, and formed with shoulders K, normally bearing against the inner face of the main piece A and limiting the inward movement of said jaws, the spring J, drawing the movable jaws toward each other, the nut I, and the screw H, substantially as set forth.

2. The combination, with the main piece having the longitudinal slot and the stationary parallel main jaws having the transverse teeth formed on their inner faces, of the inside jaws pivoted at their upper reduced ends in the said slot, having the transverse teeth formed on their operative faces, and having their inner sides formed with the inclined and straight faces, the springs, the screw, and the beveled nut, all constructed and arranged substantially as and for the purpose set forth.

ELERY BELL LA FOLLETTE.

Witnesses:
L. M. LA FOLLETTE,
J. W. DAVIDSON.